(12) United States Patent  
Cavaliere et al.

(10) Patent No.: US 10,567,290 B2  
(45) Date of Patent: Feb. 18, 2020

(54) METHOD AND SWITCH FOR MANAGING TRAFFIC IN TRANSPORT NETWORK

(71) Applicant: Telefonaktiebolaget LM Ericsson (publ), Stockholm (SE)

(72) Inventors: Fabio Cavaliere, Pisa (IT); Giulio Bottari, Pisa (IT); Stefano Stracca, Pisa (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 3 days.

(21) Appl. No.: 16/074,178

(22) PCT Filed: Apr. 7, 2016

(86) PCT No.: PCT/EP2016/057597  
§ 371 (c)(1),  
(2) Date: Jul. 31, 2018

(87) PCT Pub. No.: WO2017/137098  
PCT Pub. Date: Aug. 17, 2017

(65) Prior Publication Data  
US 2019/0260681 A1   Aug. 22, 2019

Related U.S. Application Data

(60) Provisional application No. 62/292,550, filed on Feb. 8, 2016.

(51) Int. Cl.  
*H04L 12/26* (2006.01)  
*H04L 12/801* (2013.01)  
(Continued)

(52) U.S. Cl.  
CPC ............. *H04L 47/18* (2013.01); *H04L 45/38* (2013.01); *H04L 45/66* (2013.01); *H04L 47/24* (2013.01);  
(Continued)

(58) Field of Classification Search  
CPC ... H04L 47/18; H04L 47/2433; H04L 47/283; H04L 47/24; H04L 45/38; H04L 45/66; H04L 49/25  
(Continued)

(56) References Cited

U.S. PATENT DOCUMENTS 5,404,461 A * 4/1995 Olnowich ........... G06F 13/4022  
710/316  
5,793,976 A   8/1998 Chen et al.  
(Continued)

FOREIGN PATENT DOCUMENTS

WO   2016138950 A1   9/2016  
WO   2017088911 A1   6/2017

OTHER PUBLICATIONS

Common Public Radio Interface, "Common Public Radio Interface (CPRI); Interface Specification", CPRI Specification V7.0, Oct. 9, 2015, pp. 1-128, Ericsson AB et al.

(Continued)

*Primary Examiner* — Thai D Hoang  
(74) *Attorney, Agent, or Firm* — Coats & Bennett, PLLC (57) ABSTRACT

A method for managing traffic of a plurality of packets in a plurality of packet flows transmitted using a time-slotted interface. The packet flows traverse a plurality of switches of a transport network according to an assigned path from a source node to a destination node. The method comprises determining (202) an end-to-end latency of a plurality of packets traversing a current switch in packet flows and assigning (204) priority to packets to the packets traversing the current switch, wherein a priority value of a packet depends on the determined end-to-end latency of said packets. The method further comprises allocating (206) a time (Continued)

slot in an output interface of the current switch to the packet having the highest priority value among the packets competing for said time slot.

18 Claims, 7 Drawing Sheets

(51) Int. Cl.
*H04L 12/721* (2013.01)
*H04L 12/851* (2013.01)
*H04L 12/841* (2013.01)
*H04L 12/947* (2013.01)

(52) U.S. Cl.
CPC ........ *H04L 47/2433* (2013.01); *H04L 47/283* (2013.01); *H04L 49/25* (2013.01)

(58) Field of Classification Search
USPC ......... 370/230–238.1, 352–356, 389–395.43
See application file for complete search history.

(56) References Cited

U.S. PATENT DOCUMENTS

| | | | |
|---|---|---|---|
| 6,215,412 B1* | 4/2001 | Franaszek | G06F 13/4022 |
| | | | 340/2.81 |
| 6,762,997 B1* | 7/2004 | Liu | H04L 45/12 |
| | | | 370/238 |
| 7,391,777 B2 | 6/2008 | Sridhar et al. | |
| 2007/0008884 A1* | 1/2007 | Tang | H04L 29/06 |
| | | | 370/230 |
| 2007/0274320 A1* | 11/2007 | Joshi | H04L 45/302 |
| | | | 370/395.2 |
| 2010/0150138 A1* | 6/2010 | Bjorsell | H04L 63/00 |
| | | | 370/352 |
| 2012/0163171 A1* | 6/2012 | Lee | H04L 45/302 |
| | | | 370/231 |

OTHER PUBLICATIONS

Wan, T. et al., "A Performance Study of CPRI over Ethernet", 2015 IEEE Global Communications Conference (GLOBECOM); Jan. 30, 2015, pp. 1-12, obtained online: http://www.ieee1904.org/3/meeting_archive/2015/02/tf3_1502_ashwood_1a.pdf.

* cited by examiner

METHOD AND SWITCH FOR MANAGING TRAFFIC IN TRANSPORT NETWORK

TECHNICAL FIELD

The present invention relates to communications networks, in general, and in particular to managing traffic in a transport network connecting elements of a distributed Radio Base Station.

BACKGROUND

In cellular communication networks, radio base stations (RBS) provide radio network coverage over a coverage area or cell. Communication links between the RBSs of a network and the communication network core segment are referred to as the backhaul. In traditional architectures, both radio and baseband processing are performed in the RBS, which outputs an Ethernet signal which is then transported over the backhaul using microwave and/or optical fibre.

In these traditional architectures where both radio and baseband processing are integrated in a single network element this network element is placed at the cell site. This requires power, real estate space, and relatively large cell towers. As cell sizes are getting smaller, more sites needs to be built and operated.

In some implementations, RBSs may be geographically separated into one or more Remote Radio Units (RU or RRU) and one or more baseband processing units, enabling, among other advantages, the optimising of radio unit placement. The scenario with architecture of a radio access network based on such a distributed Radio Base Station is widely identified as Centralized or Cloud Radio Access Network (CRAN). RRUs may be referred to as Radio Equipment (REs). The baseband processing units may be referred to as Digital Units (DUs) or as Radio Equipment Controllers (RECs). The communication links between REs and RECs in such deployments are collectively referred to as the fronthaul, and the interface between REs and RECs is referred to in the following description as the Fronthaul Interface (FHI). The Common Public Radio Interface (CPRI) specifies an interface protocol for the FHI, managing communication between REs and RECs. The latest version of the CPRI specification can be accessed here: http://www.cpri.info/downloads/CPRI_v_7_0_2015-10-09.pdf.

Novel radio splitting models are under definition to meet 5G high bandwidth demands, leveraging on different distribution of radio functions between antenna side equipment and centralized processing nodes. This will imply, for example, to move part of the radio processing back at the antenna side, especially for latency critical services.

In converged networks, encompassing both fronthaul and backhaul, as well as other kind of traffic, like OTN, CPRI traffic must be transported over long distances between the DU pool site and the RRUs or RBUs site (fronthaul is a term often used to identify this segment of the mobile traffic transport). Moreover, several switching nodes might be present between DU and RRU or RBUs sites. As discussed in earlier patent applications, PCT/EP2015/054502 and PCT/EP2015/077556, CPRI traffic has stringent latency, jitter and symmetry requirements and, for this reason, it requires special switching arrangements. In particular overall latency over the network shall be within about 100 μs (microseconds).

A number of transport options are under study, including packet based transport (e.g. based on Ethernet), to overcome CPRI bandwidth limitations. However, for some of these options latency requirements are similar to CPRI ones so that they also require special switching mechanisms for E2E latency control over the transport network.

It is important to note that the radio receivers expect the packets in the same sequence as they are transmitted. So all the packets of the same flow should follow the same E2E (end-to-end) path by designing the transport network not to change the packet sequence (e.g. assigning tunnels as in a regular packet network).

SUMMARY

It is the object of the present invention to obviate at least some of the above disadvantages and provide an improved method for managing traffic in a transport network connecting elements of a distributed Radio Base Station and a switch for implementing this method.

Accordingly, the invention seeks to preferably mitigate, alleviate or eliminate one or more of the disadvantages mentioned above singly or in any combination.

According to a first aspect of the present invention there is provided a method for managing traffic of a plurality of packets in a plurality of packet flows transmitted using a time-slotted interface, whereas the packet flows traverse a plurality of switches of a transport network according to an assigned path from a source node to a destination node. The method comprises determining an end-to-end latency of a plurality of packets traversing a current switch in packet flows and assigning priority values to the packets traversing the current switch. A priority value of a packet depends on the determined end-to-end latency of said packets. The method further comprises allocating a time slot in an output interface of the current switch to the packet having the highest priority value among the packets competing for said time slot.

According to a second aspect of the present invention there is provided a switch for forwarding packets to a network node of a transport network. The packets traverse the transport network according to an assigned path from a source node to a destination node. The switch comprises a plurality of input/output ports connected to a switching matrix, a processor and a memory. The memory contains instructions executable by said processor whereby said switch is operative to determine end-to-end latency of a plurality of packets traversing the switch in packet flows and to assign priority values to packets traversing the switch. A priority value of a packet depends on the determined end-to-end latency of said packet. The switch is also operative to allocate a time slot in an output interface of the switch to the packet having the highest priority value among the packets competing for said time slot.

According to a third aspect of the present invention there is provided a centralised network element for orchestrating forwarding of packets in a transport network. The packets traverse the transport network according to an assigned path from a source node to a destination node. The centralised network element comprises a processor, a memory, and a communication interface for connecting to a plurality of switches in the network. The memory contains instructions executable by said processor whereby said centralised network element is operative to determine end-to-end latency of a plurality of packets traversing a switch in packet flows and to instruct the switch to assign priority values to packets traversing the switch. A priority value of a packet depends on the determined end-to-end latency of said packet. The centralised network element is also operative to instruct the switch to allocate a time slot in an output interface of the switch to the packet having the highest priority value among the packets competing for said time slot.

According to a fourth aspect of the present invention there is provided a transport network comprising a plurality of switches. The network connects at least one baseband unit, BBU, and a plurality of remote radio units, RRUs or Radio Baseband Units, RBUs, wherein the switches are adapted to operate according to the method defined above.

According to a fifth aspect of the present invention there is provided a switch for forwarding packets to a network node of a transport network. The packets traversing the transport network according to an assigned path from a source node to a destination node. The switch comprises a plurality of input/output ports connected to a switching matrix and means for determining end-to-end latency of a plurality of packets traversing the switch in packet flows. Further, the switch comprises means for assigning priority values to packets traversing the switch, wherein a priority value of a packet depends on the determined end-to-end latency of said packet, and means for allocating a time slot in an output interface of the switch to the packet having the highest priority value among the packets competing for said time slot.

According to a sixth aspect of the present invention there is provided a centralised network element for orchestrating forwarding of packets in a transport network. The packets traverse the transport network according to an assigned path from a source node to a destination node. The centralised network element comprises a communication interface for connecting to a plurality of switches in the network and means for determining end-to-end latency of a plurality of packets traversing a switch in packet flows. The centralised network element further comprises means for instructing the switch to assign priority values to packets traversing the switch, wherein a priority value of a packet depends on the determined end-to-end latency of said packet, and means for instructing the switch to allocate a time slot in an output interface of the switch to the packet having the highest priority value among the packets competing for said time slot.

Further features of the present invention are as claimed in the dependent claims.

The present invention provides the following advantages:
- It addresses the problem of minimizing E2E latencies at a network level for time critical packet interfaces.
- It can be used in a network carrying both CPRI and packets of a time-slotted interface.
- It can be applied to any calculated end-to-end paths.
- Legacy nodes, not implementing the method, can still be part of the network. In this case the latency introduced by these not compatible nodes will be measured or estimated and then considered in the calculations done by the compatible nodes, implementing the invention.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 3:
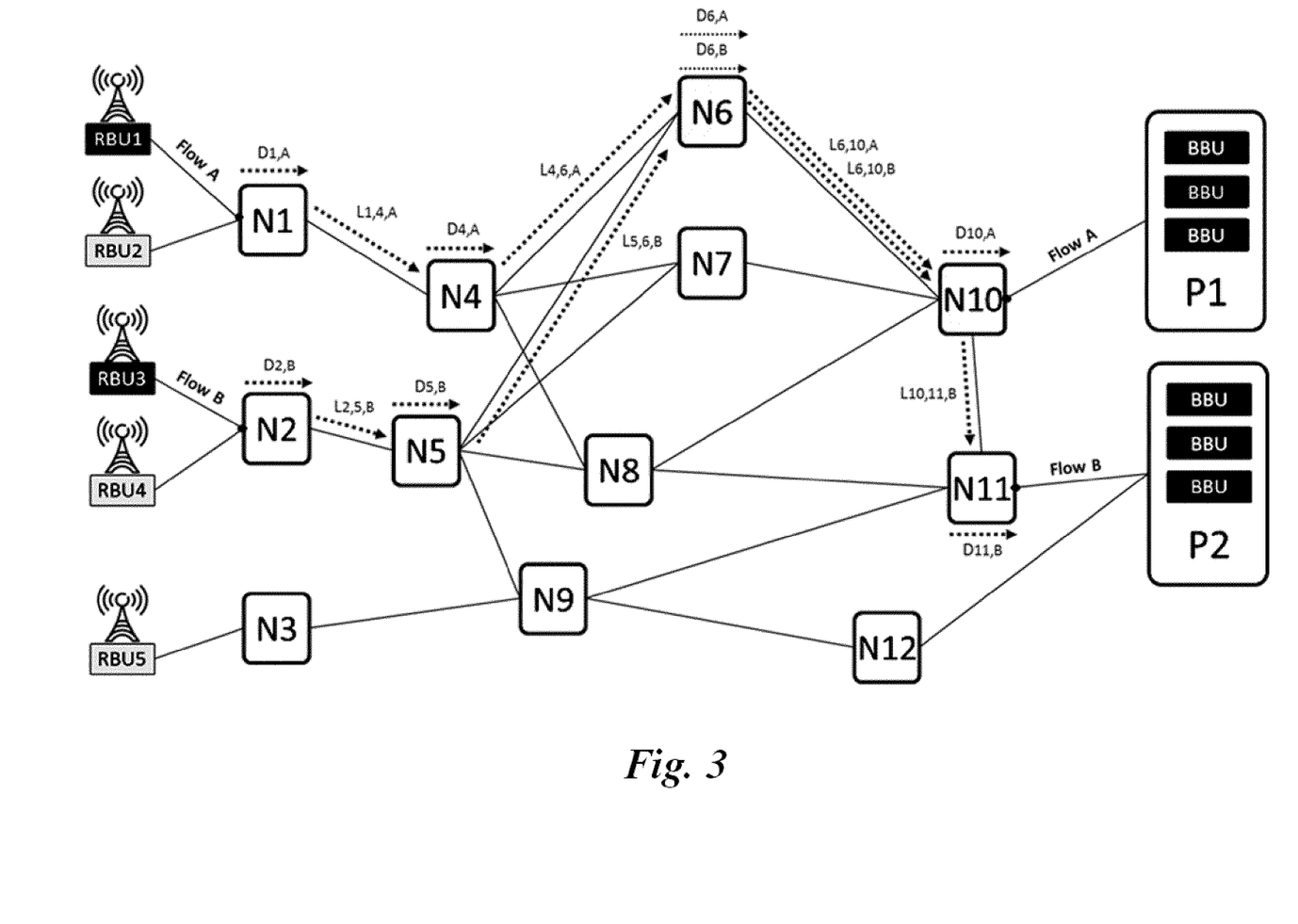
FIG. 3 is a diagram illustrating a fronthaul network operating in accordance with one embodiment of the present invention.

In order to clarify the terminology used in this document and in this technical field we will refer to the schematic drawing illustrated in FIG. 3. Here we can identify two locations where elements of distributed radio base stations are placed:

Antenna side—in FIG. 3, it is the place on the left with the antenna icons and elements marked as RBU1-RBU5.

Central office or, in other words, the centralized place where all or part of the baseband processing is done. In FIG. 3 these are P1 and P2.

In the scenario shown in FIG. 3 and later described in this document these two places are geographically separated and connected by a transport network also referred to, as explained earlier, as Fronthaul Interface or fronthaul network.

What is located at the antenna side is named as Radio Equipment (RE). RE is a term originating from the CPRI specification. Geographical distribution of the functions of a Radio Base Station may be implemented in different ways. In some implementations the Radio Equipment may comprise a Remote Radio Unit (RRU) in alternative implementations the Radio Equipment may perform some baseband processing then the RE is referred to as Radio Baseband Unit (RBU).

What is located at the central office is named as Radio Equipment Controller (REC). REC is similarly a term originating from the CPRI specification. Different names are used with reference to REC, for example Digital Unit (DU) or Baseband Unit (BBU).

It is to be appreciated that whichever terms are used with reference to the Radio Equipment and Radio Equipment Controller these elements are the source and destination nodes (end nodes) of end-to-end paths across the transport network with a plurality of nodes (switches) located between these end nodes. The invention now to be described in its embodiments is focused on managing traffic in the nodes (switches) located between these end nodes and therefore the model of distributing the functions between the RE and REC does not affect the way the present invention operates in its embodiments.

The inventors have realised that one way of supporting the architecture for 5G networks discussed in the background section may be by using packets over a time-slotted interface. In such a time division technique a source is allowed to transmit packets only at fixed time slots. To allow for statistical multiplexing among multiple packet flows of this type, unlike CPRI, the packets are transmitted only in presence of real traffic. This, in turn, enables optimization opportunities in transport.

In one embodiment the packets of the time-slotted interface outlined above are encapsulated as payload in a regular Ethernet frame, to manage all the features relevant to the transport network. Said packets may be encapsulated one packet per one Ethernet frame or multiple packets per one Ethernet frame.

By considering a network of switches, which is the most challenging case (switches acting only at the wavelength level introduce negligible latency but might be bandwidth inefficient, as discussed in PCT/EP2015/077556) the problem we intend to solve is the contention of Ethernet frames entering in different input ports of the switch that try to share the same output port.

For the sake of simplicity, in one embodiment, it is assumed that all the input Ethernet frames have the same class of service. In alternative embodiments different class of services can be managed on the top of the proposed mechanism as in regular Ethernet switches. Class of service of Ethernet frames is inherited from the one of the packet flows of the packets encapsulated in the Ethernet frames. In the description of the present solution Ethernet is used as a preferred embodiment because by using Ethernet it is possible to exploit its features (source address, destination address, class of service, etc.), but the solution described in this disclosure is really about addressing the problem of delivering packets of the time-slotted interface to destination in the same order as the packets have been sent from the source. Hence, in alternative embodiments a different technology may be used instead of Ethernet for encapsulating the packets of the time-slotted interface. Embodiments of the present invention are particularly advantageous in managing real-time or near real-time traffic, but are equally applicable to non-real-time traffic.

The goal of the proposed solution is to ensure the lowest possible end-to-end latency for each packet flow by means of an intelligent handling of all the contentions happening at the output ports of each packet switch in the network.

Figure 1:
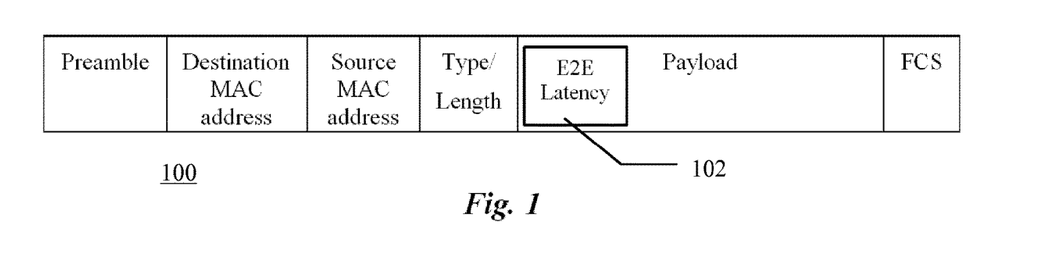
FIG. 1 is a diagram illustrating Ethernet packet including a latency budget field in one embodiment of the present invention.

In the Ethernet frame, 100, encapsulating the packet of the time-slotted interface, it is proposed to introduce a latency budget field, 102, for example as part of the payload in order to avoid modifying the well consolidated Ethernet standard. This embodiment of an Ethernet frame according to the solution described in this document is illustrated in FIG. 1.

In an alternative embodiment it is possible, however, to modify the Ethernet header by adding the latency budget field.

Packets in the same flow can experience different latency values because these values depend on whether other traffic sources are transmitting or not. So the latency budget must be managed for each individual Ethernet frame encapsulating the packet. In embodiments in which we use a single Ethernet frame to encapsulate more than one packet latency budget fields must be allocated for each packet in the frame.

In a preferred embodiment the latency budget field has two sub-fields:

Accumulated latency: it is the sum of latency contributions of all the switches and links already traversed by the Ethernet frames. The accumulated latency is determined by measurement and/or estimation (e.g. fiber propagation contributions are estimated) at the input of each switch node.

Forecasted latency: it is the estimated latency contribution of all links and nodes that the Ethernet frames have to cross before reaching its destination. For example, it can be estimated by the control plane, based on statistical measurements.

The end-to-end latency being equal to a sum of accumulated latency and forecasted latency is used as a parameter to prioritize flows in situations when plurality of Ethernet frames with encapsulated packets request access to the same output line (output port) of the Ethernet switch—the higher the latency, the higher the priority. Initially, when the Ethernet frame with an encapsulated packet of the time-slotted interface enters the first switch after being transmitted by the source node, E2E latency is entirely based on the forecasted latency, while at the end of the path, i.e. at the last switch before the destination node, the E2E latency is equal to the accumulated latency.

The mechanism can be easily modified to give different weights to packets having different class of service.

Figure 2A:
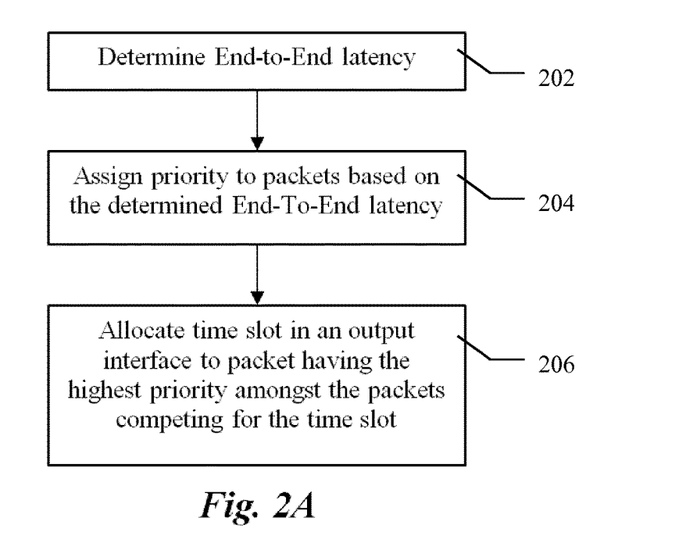
FIG. 2A is a flowchart illustrating a method for managing traffic in one embodiment of the present invention.

With reference to FIG. 2A one embodiment of a method for managing traffic of a plurality of packets organised in a plurality of packet flows will be described. In this embodiment the packets are transmitted using a time-slotted interface and said packet flows traverse a plurality of switches according to an assigned path. In a preferred embodiment the method comprises determining end-to-end latency, 202, of a plurality of packets traversing a current switch in packet flows. The method further comprises assigning priority values, 204, to the packets traversing the current switch, wherein a priority value of a packet depends on the determined end-to-end latency of said packet and allocating a time slot, 206, in an output interface of the current switch to the packet having the highest priority value among the packets competing for said time slot.

Figure 2B:
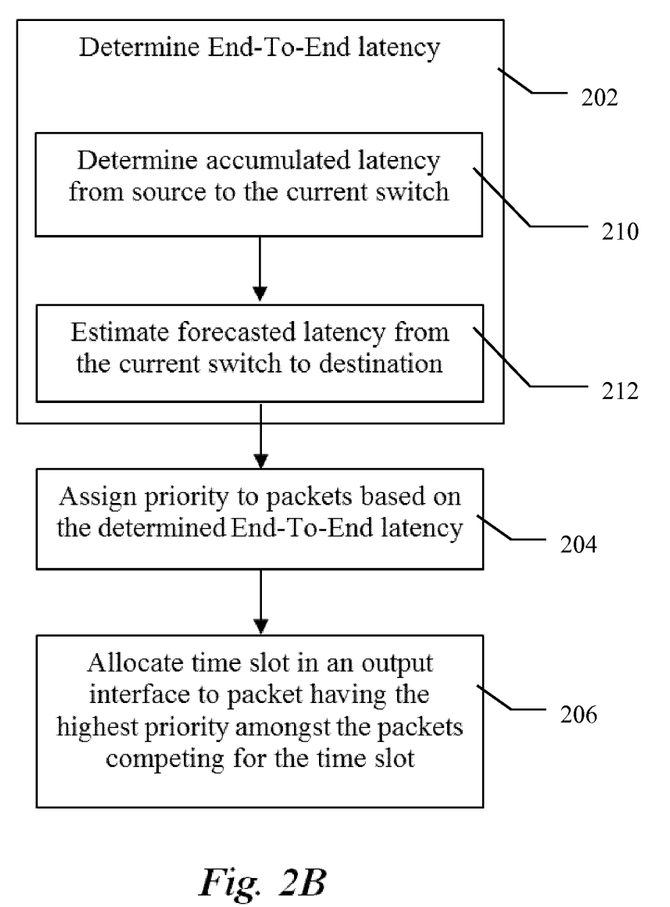
FIG. 2B is a flowchart illustrating a method for managing traffic in one embodiment of the present invention.

As illustrated in FIG. 2B determining the end-to-end latency, 202, preferably comprises determining an accumulated latency, 210, from a source node to the current switch and estimating a forecasted latency, 212, from the current switch to a destination node based on the path assigned to the packet flow. Finally, the end-to-end latency is calculated as a sum of the accumulated and forecasted latency values.

In a preferred embodiment the operation of estimating the forecasted latency comprises determining an accumulated latency from the destination node to the current switch based on packets travelling from the destination node to the current switch. This is applicable in situations when the path between the current switch and the destination node is bi-directional. In this situation it is possible to use actual delay from the switches and links located ahead of the current switch. This still is an estimation, albeit more accurate, because at the time of using this information conditions in the network may change and it will be a historical information and not current.

Preferably, the end-to-end latency determined at node C, for a given flow i, can be expressed by the sum of three contributions, where the generic intermediate node, in an E2E flow path, is indicated as the current node C:

$$\tilde{L}_{E2E}(i,C) = L_{S,C}(i) + L_C(i) + \tilde{L}_{C,D}(i)$$

where:
- $L_{S,C}(i)$ is the measured, accumulated, latency from S (source) to C for flow i; it has been cumulated in the nodes and links traversed on partial sub-path up to C.
- $L_C(i)$ is the latency which node C imposes on the flow; it is determined by a minimum traversing delay but can be incremented if other flows are prioritized.
- $\tilde{L}_{C,D}(i)$ is the estimated, forecasted, latency from C to D (destination); the final sub-path to reach the destination will introduce a further latency contribution and the component cumulated in the nodes is not deterministic.

One can see that the latency estimation drops in significance as the current node C gets closer to the destination node because measurements prevail over estimations.

The proposed method operates, at an individual node (switch), according to the following steps.

For each node n of the network
  For each flow i traversing node n
    Calculate $\tilde{L}_{E2E}(i, n)$
  Next i
  Transmit in the next slot the flow with maximum $\tilde{L}_{E2E}(i, n)$ among all the flows traversing n
Next n The procedure is applied at an individual node (preferably each node traversed by the flow) by considering all the flows which are competing for an outgoing time-slot from the same output port on the node. In practice, the node scheduler assigns "the next slot" for outgoing transmission to the flow that is expected to cumulate the worse E2E latency (i.e. the highest latency) among all the flows that cross the node (switch) itself.

By considering the overall network and the complete set of flows, the goal is to equalize as much as possible the E2E latencies of all the flows.

Preferably, determining the end-to-end latency comprises considering switching delay introduced by the switches along the path and ignoring propagation delay. This may be advantageous in certain situations. For example, if a first flow has to travel for 1 km and a second one for 10 km to the current switch taking into account propagation delay would unnecessarily penalize the first flow.

In another embodiment assigning priority values to the packets traversing the current switch comprises applying weighting factors based on class of service associated with the packets. This embodiment reflects the fact that one traffic flow may be more important than other traffic flow and their relative importance (reflected by the class of service) may be an additional factor to consider.

In a preferred embodiment the operations of the method are applied separately within each class of service associated with the packets. In this embodiment all the traffic in the current switch is split into separate streams depending on their class of service and then the operations of the method are applied separately for each class off service. In this way each class of service is processed independently from the other classes. This embodiment has the advantage that it does not affect the established hierarchy of the classes of service, but rather improve managing of packet flows within individual class of service. In a modification of this embodiment the operations of the method are applied to packets having the same class of service. This alternative embodiment allows for leaving out a certain class of service from managing as described above. The certain class of service may for example be a low-priority, pre-emptible traffic served on best effort basis. The advantage of this embodiment is that processing resources in the current switch will be saved (not used on processing low priority traffic), which will improve performance of the switch.

As mentioned earlier, in a preferred embodiment packets of the packet flows are transported in the fronthaul network encapsulated as payload in Ethernet frames. In alternative embodiments other network transport interface may be used instead of Ethernet. A fronthaul network in this document is a transport network connecting elements of a distributed Radio Base Station, i.e. connecting RE and REC as discussed earlier and illustrated in FIG. 3.

Figure 5:
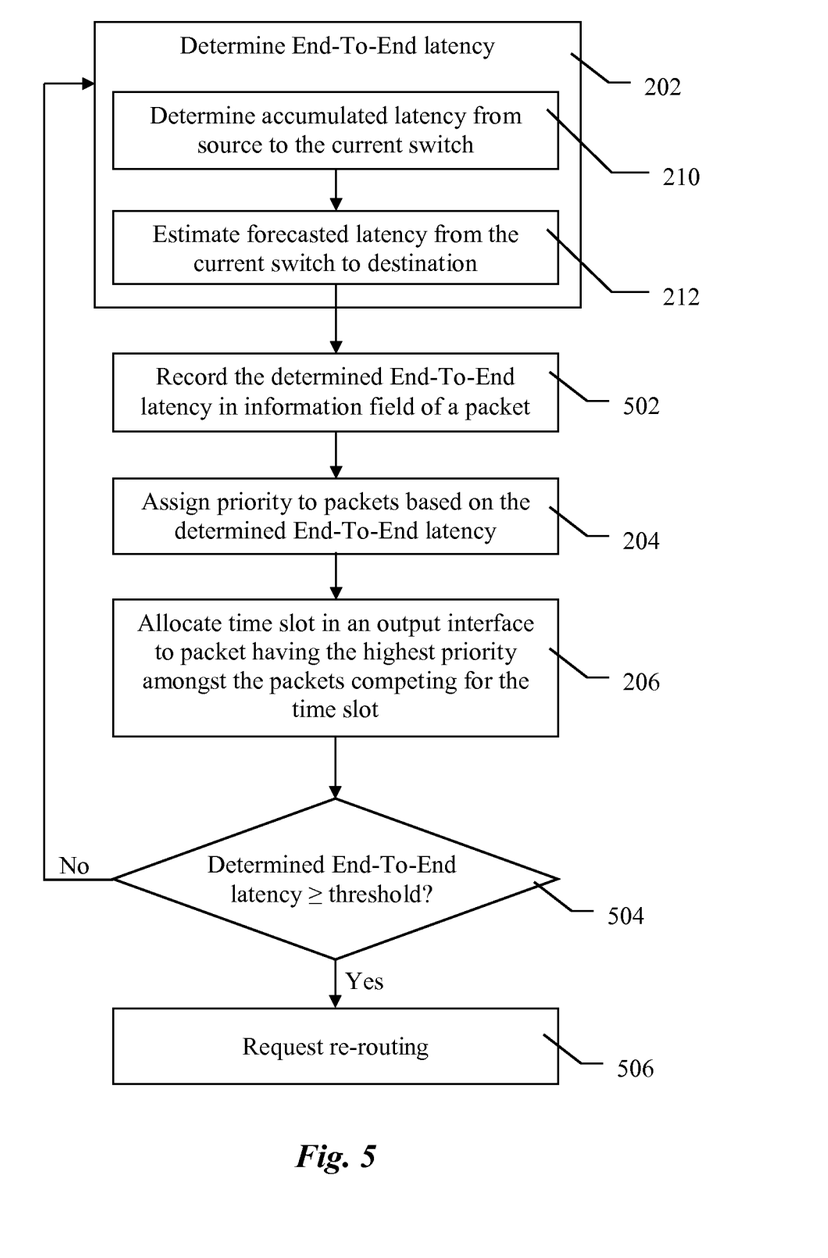
FIG. 5 is a flowchart illustrating a method for managing traffic in another embodiment of the present invention.

As illustrated in FIG. 5, the method preferably comprises recording, 502, in a dedicated information field associated with a packet traversing the current switch the determined end-to-end latency for this packet. In a preferred embodiment in which payload of an Ethernet frame, 100, is used to transport the packet of the time-slotted interface the dedicated information field, 102, associated with the packet is also inserted in the payload of the Ethernet frame 100. This is illustrated in FIG. 1. The determined end-to-end latency may be recorded as separate values for accumulated latency and forecasted latency; alternatively it may be recorded as separate values for accumulated latency, forecasted latency and latency imposed by the current switch. In yet another embodiment in the dedicated information field the determined end-to-end latency may be recorded as a single total value including the components discussed above.

As the Ethernet frame with the encapsulated packet of the time-slotted interface travels along the path towards the destination node the recording of the determined end-to-end latency comprises updating the information about the determined end-to-end latency carried in said dedicated information field from a previous switch.

In a particularly advantageous embodiment the method comprises requesting, 506, from a path computation element to re-route a particular path to a destination node if network conditions do not guarantee fulfilling end-to-end latency needs, 504. In particular the re-routing of the particular path to the destination node may be requested, 506, if the determined end-to-end latency is at or above a threshold, 504. The advantage of this embodiment is that not only it allows for improved management of packet flows along a predefined path, but also allows for reacting to changing network conditions and re-routing once the network conditions deteriorate and expected performance cannot be guaranteed.

In another embodiment this document discloses a network of switches, where an individual switch in the network is adapted to operate according to the method described above. In a preferred embodiment all switches in the network are adapted to operate according to this method. In alternative embodiment only some of the switches operate in accordance with this method. The switches which are not capable of processing the latency information switch Ethernet frames with encapsulated packets in the same way as well known switches and the switches capable of handling the latency information will assign priority based on the End-to-End latency information. In other words, the switches which are not capable of processing the latency information will simply ignore the latency information and the switches capable for processing the latency information will determine the components of the end-to-end latency using estimation where it is not possible to get measurements. An embodiment of the network operating in accordance with the method described in this document is illustrated in FIG. 3.

FIG. 3 illustrates a scenario of a (partially) centralized baseband processing based on Radio Baseband Units, RBUs, operating as Radio Equipment (RE) and Baseband Units, BBUs, operating as Radio Equipment Controllers (RECs). As explained earlier RE and REC are elements of a distributed Radio Base Station where the controller (REC) comprising at least some baseband processing functions are centralised and serve plurality of remotely located RE elements. The RBUs and BBUs communicate via packet flows over a time-slotted interface. Five macro sites, with their RBUs, RBU1-RBU5, are on the left. In the embodiment illustrated in FIG. 3 the end points of the traffic traversing the plurality of switches include six baseband units, BBUs, and five Radio Baseband Units, RBU1-RBU5. The six BBUs are located in two baseband hotels located on the right in two sites labeled as P1 and P2. A packet network comprising twelve nodes N1-N12 is located in-between. A baseband hotel is also known as baseband pool-radio frequency heads at base station sites are connected over high speed link, e.g. optical fibre to a baseband pool. The packet flows from RBUs to BBUs are considered an uplink (UL), while the packet flows in the opposite direction are considered a downlink (DL).

In an alternative embodiment Remote Radio Units (RRUs) may operate as the Radio Equipment instead of the RBUs and then the BBUs in the two baseband hotels P1 and P2 would perform all the baseband processing for the RRUs.

In a preferred embodiment all the input data are frequency synchronous and have the same bit rate. They are time synchronized at the input of each switch (max introduced latency=1 encapsulated frame).

Each flow is transmitted from a source node S, traverses a sequence of nodes Nx and a sequence of links connecting said nodes, and finally terminates a destination node D. Nodes Nx and links introduce latencies on each flow. In a preferred embodiment link latencies are considered fixed for each link and traffic independent.

As disclosed earlier priority of Ethernet frames processed by the switch is inherited from the packets encapsulated in these frames. The same is true for relationship between latency of the packets and Ethernet frames.

In a preferred embodiment determining the end-to-end latency comprises adding latency imposed by the individual switch to the accumulated latency and the forecasted latency.

In the example illustrated in FIG. 3 two packet flows are transmitted:

Flow A, marked with a dotted line and with letter A, from RBU1 to one of the BBUs in P1

Flow B, marked with a dotted line and with letter B, from RBU3 to one of the BBUs in P2

In FIG. 3 the notation L1,4,A refers to latency on the link between nodes N1 and N4 experienced by flow A; the notation D1,A refers to switching delay experienced by flow A at node N1. The same notation scheme is applicable throughout FIG. 3.

The paths used by flow A and flow B share nodes N6 and N10 and the link in between. Let's focus on node N6 first.

The two flows compete for a time slot on the outgoing port of N6 towards N10. The flow having the higher expected E2E latency will be prioritized. The two latencies are:

$$\tilde{L}_{E2E}(A,N6) = L_{RBU1,N6}(A) + L_{N6}(A) + \tilde{L}_{N6,P1}(A)$$

and $$\tilde{L}_{E2E}(B,N6) = L_{RBU2,N6}(B) + L_{N6}(B) + \tilde{L}_{N6,P2}(B)$$

where:
$L_{RBU1,N6}(A)$ is the measured latency between RBU1 and N6
$\tilde{L}_{N6,P1}(A)$ is the estimated latency between N6 and P1
$L_{RBU2,N6}(B)$ is the measured latency between RBU2 and N6
$\tilde{L}_{N6,P2}(B)$ is the estimated latency between N6 and RBU2

In the hypothesis that $\tilde{L}_{E2E}(A, N6) > \tilde{L}_{E2E}(B, N6)$ the determined end-to-end latency for flow A is higher than corresponding determined end-to-end latency for flow B and node N6 will prioritize flow A with respect to flow B. As a consequence $L_{N6}(A)$ will be less than $L_{N6}(B)$, where $L_{N6}(B)$ and $L_{N6}(A)$ is the latency imposed by N6 on flow A and flow B respectively. As can be seen from the analysis flow A will have priority over flow B and this is why latency imposed by switch N6 onto flow B will be higher than latency imposed on flow A.

It is assumed, in a preferred embodiment, that each flow is bi-directional and the two directions are operated on the same E2E path. Optionally, latency values in one direction, in a specific node, for a specific flow, can be used to improve the accuracy of the estimation for the same flow, in the same node, in the opposite direction.

In case that current network condition do not allow to fulfill E2E latency needs of a given flow, a feedback can be done to a path computation element to consider a re-routing of said flow to a less congested end-to-end path.

In alternative embodiments nodes not implementing the method may be included in the network. In this case the latencies introduced by these not compatible nodes will be measured or estimated and then considered in the calculations done for the compatible nodes, implementing the method. In this way, the method can contribute to smooth differentials in end-to-end latencies even in partially legacy networks.

Figure 4:
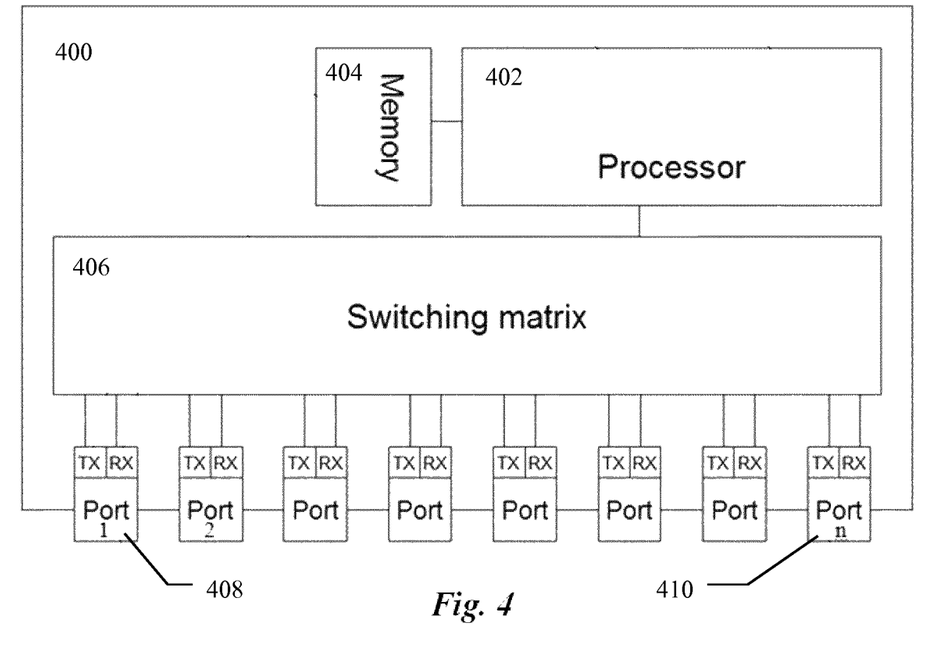
FIG. 4 is a diagram illustrating a switch in one embodiment of the present invention.

With reference to FIG. 4 an embodiment of a switch adapted to operate in accordance with the method described in this document is now to be described.

Illustrated in FIG. 4 is a preferred embodiment of the switch, 400, adapted to operate in accordance with the method described above. The switch, 400, comprises a plurality if input/output ports, 408-410, connected to a switching matrix, 406, a processor, 402, and a memory, 404. Said memory, 404, contains instructions executable by said processor, 402. Said switch 400, upon executing said instructions is operative to determine end-to-end latency of a plurality of packets traversing the switch, 400, in packet flows and assign priority values to packets traversing the switch, 400, wherein a priority value of a packet depends on the determined end-to-end latency of said packet. The switch, 400, is further operative to allocate a time slot in an output interface of the switch to the packet having the highest priority value among the packets competing for said time slot.

The switch, 400, is operative to forward packets to a network node of a fronthaul network, for example another switch or a destination node, like Radio Equipment (e.g.

RRU or RBU) or Radio Equipment Controller (e.g. DU or BBU). The packets traverse the fronthaul network according to an assigned (or predefined) path from a source node to a destination node.

In a preferred embodiment in determining the end-to-end latency the switch, 400, is operable to determine an accumulated latency from the source node to the switch and to estimate a forecasted latency from the switch to the destination node based on the path assigned to the packet flow. The switch is also operable to calculate the end-to-end latency as the sum of the accumulated and forecasted latency values.

In a preferred embodiment the packets are encapsulated in frames of a transport interface, for example Ethernet, and the latency and priority are determined for the frames carrying the encapsulated packets.

In a preferred embodiment Ethernet is used as the time-slotted interface, but in alternative embodiments instead of Ethernet other time-slotted transport technologies may be used.

Path computation methodology, for flows traversing the network, is out of scope of the present disclosure. It is assumed that the method applies to a set of flows which paths have been calculated in advance, as it is done in many optical networks. In an alternative embodiment the proposed method is compatible with a network architecture in which a centralized entity, such as an orchestrator, for example, has a full visibility of the latency contributions of nodes and links. The orchestrator also computes the estimates and forecasts. The orchestrator itself can manage the priority list for each node and determine the next flow in line for each node. Preferably, class of services can also be considered as an additional parameter used to determine flow priorities by the orchestrator.

Figure 6:
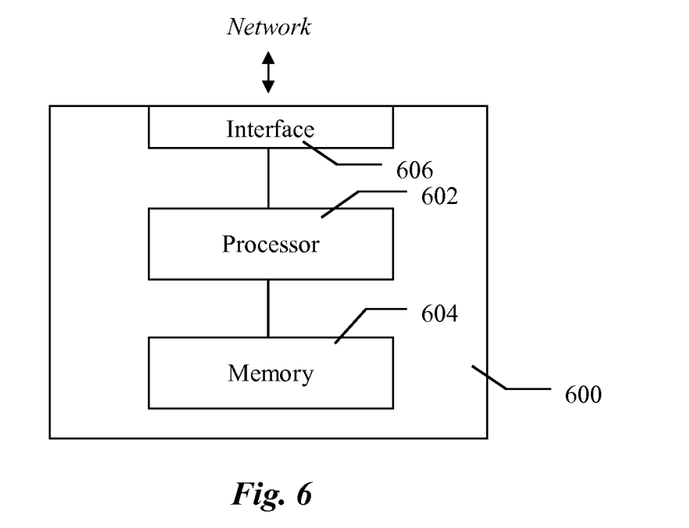
FIG. 6 is a diagram illustrating a centralised network element for orchestrating forwarding of packets in a fronthaul network in one embodiment of the present invention.

With reference to FIG. 6 an embodiment of a centralised network element adapted to operate in accordance with the method described in this document is now to be described.

Illustrated in FIG. 6 is a preferred embodiment of the centralised network element, 600, for orchestrating forwarding of packets in a fronthaul network adapted to operate in accordance with the method described above. In embodiments in which the centralized network element 600 is used packets traverse the fronthaul network according to an assigned path from a source node to a destination node. The centralised network element, 600, comprises a processor, 602, a memory, 604, and a communication interface, 606, for connecting to a plurality of switches in the network. Said memory, 604, contains instructions executable by said processor, 602, whereby said centralised network element, 600, is operative to determine end-to-end latency of a plurality of packets traversing a switch in packet flows and to instruct the switch to assign priority values to packets traversing the switch, wherein a priority value of a packet depends on the determined end-to-end latency of said packet. Further, said centralised network element, 600, is operative to instruct the switch to allocate a time slot in an output interface of the switch to the packet having the highest priority value among the packets competing for said time slot.

Figure 7:
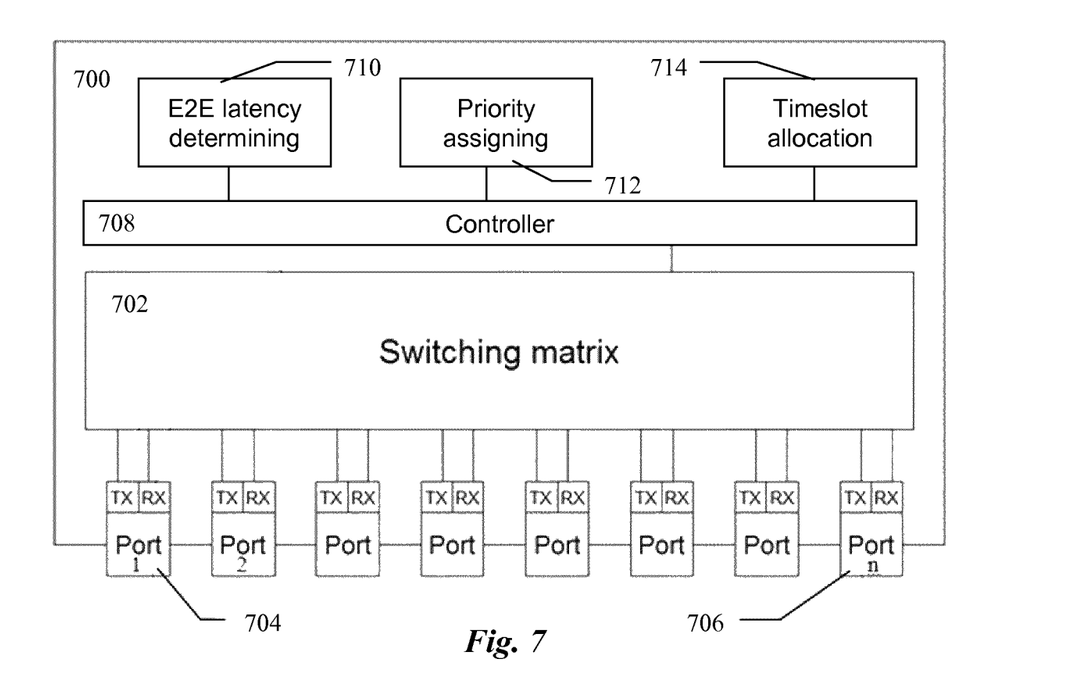
FIG. 7 is a diagram illustrating a switch in an alternative embodiment of the present invention.

With reference to FIG. 7 an alternative embodiment of a switch, 700, operating in accordance with the embodiments of the method described in this document, is disclosed. The switch 700 is for forwarding packets to a network node of a transport network and the packets traverse the transport network according to an assigned path from a source node to a destination node. The switch 700 comprises a plurality of input/output ports, 704-706, connected to a switching matrix, 702. The switch 700 further comprises means, 710, for determining end-to-end latency of a plurality of packets traversing the switch in packet flows and means, 712, for assigning priority values to packets traversing the switch, 700. A priority value of a packet depends on the determined end-to-end latency of said packet. The switch 700 further comprises means, 714, for allocating a time slot in an output interface of the switch to the packet having the highest priority value among the packets competing for said time slot.

In one embodiment the means 710, 712 and 714 are controlled by a controller means 708. In another alternative embodiment (not illustrated) said means 710, 712 and 714 are implemented as functions provided by the controller 708. In yet another embodiment said means 710, 712 and 714 as well as the switching matrix 702 are connected to a communication bus (not illustrated) and exchange data and control messages over this communication bus.

Figure 8:
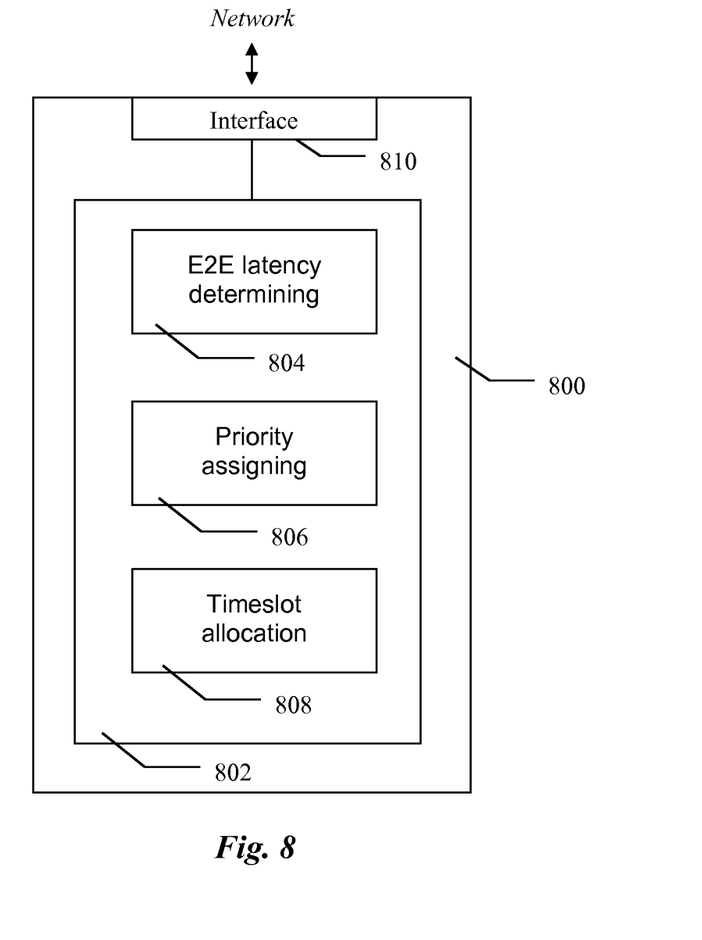
FIG. 8 is a diagram illustrating a centralised network element for orchestrating forwarding of packets in a fronthaul network in an alternative embodiment of the present invention.

With reference to FIG. 8 and alternative embodiment of a centralised network element, 800, for orchestrating forwarding of packets in a transport network is disclosed. The packets traverse the transport network according to an assigned path from a source node to a destination node. In a preferred embodiment the centralised network element 800 comprises a communication interface, 810, for connecting to a plurality of switches in the network. The centralised network element also comprises means 804 for determining end-to-end latency of a plurality of packets traversing a switch in packet flows and means, 806, for instructing the switch to assign priority values to packets traversing the switch. In a preferred embodiment a priority value of a packet depends on the determined end-to-end latency of said packet. The centralised network element, 800, further comprises means, 808, for instructing the switch to allocate a time slot in an output interface of the switch to the packet having the highest priority value among the packets competing for said time slot.

In one embodiment said means 804, 806 and 808 are implemented as functions provided by the controller 802. In an alternative embodiment (not illustrated) the means 804, 806 and 808 are controlled by a controller 802, wherein the means 804, 806 and 808 and the controller 802 are implemented as separate modules. In yet another embodiment said means 804, 806 and 808 as well as the communication interface 810 are connected to a communication bus (not illustrated) and exchange data and control messages over said communication bus.

The centralised network element, 800, is adapted to operate in accordance with the embodiments of the method described earlier.

The invention claimed is:

1. A method for managing traffic of a plurality of packets in a plurality of packet flows transmitted using a time-slotted interface, each of the packet flows traversing a plurality of switches of a transport network according to an assigned path from a source node to a destination node, the method comprising:
   determining an end-to-end latency of a plurality of packets traversing a current switch in packet flows, wherein determining the end-to-end latency comprises, for each packet flow:
      determining an accumulated latency from the source node of the packet flow to the current switch;
      estimating a forecasted latency from the current switch to the destination node of the packet flow based on the assigned path of the packet flow;

calculating the end-to-end latency of the packet flow as a sum of the accumulated latency value and forecasted latency value for the packet flow;

assigning priority values to the packets traversing the current switch, wherein a priority value of a packet depends on the determined end-to-end latency of the packets; and allocating a time slot in an output interface of the current switch to the packet having the highest priority value among the packets competing for the time slot.

2. The method of claim 1, wherein the estimating the forecasted latency comprises determining an accumulated latency from the destination node to the current switch based on packets travelling from the destination node to the current switch.

3. The method of claim 1, wherein the determined end-to-end latency includes latency introduced by the current switch.

4. The method of claim 1, wherein the determining the end-to-end latency comprises considering switching delay introduced by the switches along the path and ignoring propagation delay.

5. The method of claim 1, wherein the assigning priority values to the packets traversing the current switch comprises applying weighting factors based on class of service associated with the packets.

6. The method of claim 1, wherein operations of the method are applied separately within each class of service associated with the packets.

7. The method of claim 1, wherein operations of the method are applied to packets having the same class of service.

8. The method of claim 1, wherein end points of the traffic traversing the plurality of switches include at least one baseband unit (BBU) and a plurality of remote radio units (RRUs) or Radio Baseband Units (RBUs).

9. The method of claim 1, wherein packets of the packet flows are transported in the transport network encapsulated as payload in Ethernet frames.

10. The method of claim 1, further comprising recording, in a dedicated information field associated with a packet traversing the current switch, the determined end-to-end latency for this packet.

11. A switch for forwarding packets to a network node of a transport network, the packets traversing the transport network according to an assigned path from a source node to a destination node, the switch comprising:

a plurality of input/output ports connected to a switching matrix, processing circuitry operatively connected to the plurality of input/output ports;

memory containing instructions executable by the processing circuitry whereby the switch is operative to:
determine end-to-end latency of a plurality of packets traversing the switch in packet flows, wherein to determine the end-to-end latency the switch is operative to, for each packet flow:
determine an accumulated latency from the source node of the packet flow to the switch;
estimate a forecasted latency from the switch to the destination node of the packet flow based on the assigned path of the packet flow;
calculate the end-to-end latency of the packet flow as a sum of the accumulated latency value and forecasted latency value for the packet flow;

assign priority values to packets traversing the switch, wherein a priority value of a packet depends on the determined end-to-end latency of the packet; and
allocate a time slot in an output interface of the switch to the packet having the highest priority value among the packets competing for the time slot.

12. The switch of claim 11, wherein the instructions are such that the switch is operative, in estimating the forecasted latency, to determine an accumulated latency from the destination node to the switch based on packets travelling from the destination node to the switch.

13. The switch of claim 11, wherein the determined end-to-end latency includes latency introduced by the switch.

14. The switch of claim 11, wherein the instructions are such that the switch is operative, in assigning priority values to the packets traversing the switch, to apply weighting factors based on class of service associated with the packets.

15. The switch of claim 11, wherein end points of the traffic traversing the plurality of switches include at least one baseband unit (BBU) and a plurality of remote radio units (RRUs) or Radio Baseband Units (RBUs).

16. The switch of claim 11, wherein the instructions are such that the switch is operative to record, in a dedicated information field of a packet traversing the switch, the determined end-to-end latency for this packet.

17. A centralized network element for orchestrating forwarding of packets in a transport network, the packets traversing the transport network according to an assigned path from a source node to a destination node, the centralized network element comprising:

a communication interface for connecting to a plurality of switches in the network;

processing circuitry operatively connected to the communication interface;

memory containing instructions executable by the processing circuitry whereby the centralized network element is operative to:
determine end-to-end latency of a plurality of packets traversing a switch in packet flows, wherein to determine the end-to-end latency the centralized network element is operative to, for each packet flow:
determine an accumulated latency from the source node of the packet flow to the switch;
estimate a forecasted latency from the switch to the destination node of the packet flow based on the assigned path of the packet flow;
calculate the end-to-end latency of the packet flow as a sum of the accumulated latency value and forecasted latency value for the packet flow;

instruct the switch to assign priority values to packets traversing the switch, wherein a priority value of a packet depends on the determined end-to-end latency of the packet; and
instruct the switch to allocate a time slot in an output interface of the switch to the packet having the highest priority value among the packets competing for the time slot.

18. A transport network, comprising:
a plurality of switches connecting at least one baseband unit (BBU) and a plurality of remote radio units (RRUs) or Radio Baseband Units (RBUs);
wherein the plurality of switches are configured to manage traffic of a plurality of packets in a plurality of packet flows transmitted using a time-slotted interface, the packet flows traversing the plurality of switches of the transport network according to an assigned path from a source node to a destination node;

wherein the plurality of switches are configured to manage the traffic by:

determining an end-to-end latency of a plurality of packets traversing a current switch in packet flows, wherein determining the end-to-end latency comprises, for each packet flow:

determining an accumulated latency from the source node of the packet flow to the current switch;

estimating a forecasted latency from the current switch to the destination node of the packet flow based on the assigned path of the packet flow;

calculating the end-to-end latency of the packet flow as a sum of the accumulated latency value and forecasted latency value for the packet flow;

assigning priority values to the packets traversing the current switch, wherein a priority value of a packet depends on the determined end-to-end latency of the packets; and allocating a time slot in an output interface of the current switch to the packet having the highest priority value among the packets competing for the time slot.

* * * * *

UNITED STATES PATENT AND TRADEMARK OFFICE
CERTIFICATE OF CORRECTION

PATENT NO. : 10,567,290 B2
APPLICATION NO. : 16/074178
DATED : February 18, 2020
INVENTOR(S) : Cavaliere et al.

Page 1 of 1

It is certified that error appears in the above-identified patent and that said Letters Patent is hereby corrected as shown below:

On the Title Page

In Item (57), under "ABSTRACT", in Column 2, Line 8, delete "priority to packets" and insert -- priority values --, therefor.

In the Specification

In Column 1, Line 45, delete "http://www.cpri.info/downloads/CPR1_v_7_0_2015-10-09.pdf." and insert -- http://www.cpri.info/downloads/CPRI_v_7_0_2015-10-09.pdf. --, therefor.

In Column 9, Line 59, delete "P2" and insert -- P2. --, therefor.

In Column 10, Line 17, delete "RBU2" and insert -- RBU2. --, therefor.

Signed and Sealed this
Twenty-third Day of June, 2020

Andrei Iancu
*Director of the United States Patent and Trademark Office*